United States Patent
Ono et al.

(10) Patent No.: US 11,215,109 B2
(45) Date of Patent: Jan. 4, 2022

(54) INTERNAL COMBUSTION ENGINE WITH PRE-CHAMBER

(71) Applicant: Mazda Motor Corporation, Hiroshima (JP)

(72) Inventors: Ryohei Ono, Aki-gun (JP); Kenji Uchida, Aki-gun (JP); Yuji Harada, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/130,944

(22) Filed: Dec. 22, 2020

(65) Prior Publication Data

US 2021/0246822 A1 Aug. 12, 2021

(30) Foreign Application Priority Data

Feb. 12, 2020 (JP) .............................. JP2020-021639

(51) Int. Cl.
- *F02B 19/08* (2006.01)
- *F02B 19/10* (2006.01)
- *F02B 19/16* (2006.01)

(52) U.S. Cl.
CPC .......... *F02B 19/1014* (2013.01); *F02B 19/08* (2013.01); *F02B 19/108* (2013.01); *F02B 19/1061* (2013.01); *F02B 19/165* (2013.01)

(58) Field of Classification Search
CPC .............. F02B 19/1014; F02B 19/1061; F02B 19/108; F02B 19/165; F02B 19/08

USPC ....... 123/260, 262, 263, 266, 301, 302, 306, 123/307, 309

See application file for complete search history.

(56) References Cited

U.S. PATENT DOCUMENTS

| | | | |
|---|---|---|---|
| 8,720,411 B2 * | 5/2014 | Redtenbacher | F02B 19/108 123/286 |
| 2015/0128898 A1 | 5/2015 | Osaka | |

FOREIGN PATENT DOCUMENTS

| | | |
|---|---|---|
| JP | 2015094303 A | 5/2015 |
| JP | 2018172974 A | 11/2018 |

* cited by examiner

*Primary Examiner* — Hai H Huynh
(74) *Attorney, Agent, or Firm* — Alleman Hall Creasman & Tuttle LLP

(57) ABSTRACT

An internal combustion engine is provided with a pre-chamber provided inside a main combustion chamber. The pre-chamber includes an ignition plug, and a casing provided to a ceiling part to cover the ignition plug, the casing isolating an internal space formed therein from the main combustion chamber. A tumble flow of a mixture gas is formed inside the main combustion chamber. A plurality of communicating holes are formed in the casing, and include a first communicating hole opening to an intake port side and a second communicating hole opening to an exhaust port side. The tumble flow flowing into the pre-chamber through the first communicating hole forms in the pre-chamber a vortex flowing in the opposite direction from the tumble flow. The main combustion chamber is provided with a structure configured to suppress a flow opposing the vortex flowing into the pre-chamber through the second communicating hole.

13 Claims, 7 Drawing Sheets

INTERNAL COMBUSTION ENGINE WITH PRE-CHAMBER

TECHNICAL FIELD

The art disclosed herein relates to an internal combustion engine with a pre-chamber.

BACKGROUND OF THE DISCLOSURE

JP2015-094303A discloses an internal combustion engine with a pre-chamber. The pre-chamber of the internal combustion engine is provided inside a cylinder head so as to oppose a main combustion chamber. An auxiliary fuel injection valve injects fuel into the pre-chamber, and an ignition plug ignites a mixture gas inside the pre-chamber. A flame jet is injected into the main combustion chamber from the pre-chamber through a plurality of nozzles. The flame jet is promptly spread inside the main combustion chamber to improve the thermal efficiency of the internal combustion engine.

JP2018-172974A also discloses an internal combustion engine with a pre-chamber. In this internal combustion engine, a partition member which isolates the pre-chamber from a main combustion chamber is attached to a ceiling part of the main combustion chamber. A part of the partition member protrudes into the main combustion chamber. This internal combustion engine is not provided with an auxiliary fuel injection valve, unlike the internal combustion engine disclosed in JP2015-094303A. A portion of the mixture gas formed inside the main combustion chamber flows into the pre-chamber through communicating holes formed in the partition member during a compression stroke. By an ignition plug igniting the mixture gas inside the pre-chamber, flame passes through the communicating holes and blows out into the main combustion chamber like a torch.

The configuration of the pre-chamber like the internal combustion engine disclosed in JP2018-172974A may spoil the rapid combustion inside the main combustion chamber. That is, in the pre-chamber disclosed in JP2018-172974A, the ignition plug is provided to an upper end part of the pre-chamber, and the communicating holes are formed in a lower end part of the pre-chamber. Thus, a distance between the ignition plug and the communicating holes is comparatively long. If the combustion of the mixture gas inside the pre-chamber is slow, the flame generated on the ignition-plug side may push out the unburnt mixture gas which remains on the communicating hole side into the main combustion chamber. In this case, when the unburnt mixture gas is pushed out into the main combustion chamber, the rapid combustion inside the main combustion chamber is spoiled.

The present inventors thought about strengthening a flow of the mixture gas inside the pre-chamber, in order to make the rapid combustion of the mixture gas inside the pre-chamber possible. Therefore, a tumble flow is generated inside the main combustion chamber, and the tumble flow is allowed to flow into the pre-chamber through the communicating hole. In detail, by orientating the hole axes of some of the communicating holes toward an intake port, the communicating holes oppose the tumble flow. Therefore, the tumble flow flows into the pre-chamber. By the tumble flow flowing into the pre-chamber, a vortex in the opposite direction from the tumble flow is generated inside the pre-chamber. Since the vortex does not disturb the flow inside the pre-chamber, it does not lower the ignitability of the ignition plug and stimulates flame propagation after ignition. Therefore, the mixture gas inside the pre-chamber combusts quickly.

However, according to the analyses of the present inventors, they have noticed that the combustion of the mixture gas inside the pre-chamber may not be as rapid as they expected even if the measures described above are taken.

SUMMARY OF THE DISCLOSURE

The art disclosed herein makes combustion of a mixture gas inside a pre-chamber rapid.

According to the analyses of the present inventors, they have noticed that a squish flow which is generated inside a main combustion chamber in the final stage of a compression stroke flows into the pre-chamber through the communicating hole which opens to the exhaust port side. Even when a tumble flow inside the main combustion chamber is flowed into the pre-chamber during an intake stroke and a compression stroke so as to generate a vortex in the opposite direction from the tumble flow in the pre-chamber, the vortex is made weak because the squish flow flowed into the pre-chamber opposes the vortex in the final stage of the compression stroke. When the vortex formed inside the pre-chamber becomes weaker, the combustion of the mixture gas becomes slower.

Thus, the present inventors reached the art disclosed herein by providing to the main combustion chamber a structure for suppressing that the flow opposing the vortex flows into the pre-chamber.

Specifically, the art disclosed herein relates to an internal combustion engine with a pre-chamber provided inside a main combustion chamber.

The pre-chamber includes an ignition plug attached to a ceiling part of the main combustion chamber and configured to ignite a mixture gas containing a fuel component and air, and a casing provided to the ceiling part so as to cover the ignition plug, the casing isolating an internal space formed therein from the main combustion chamber. The main combustion chamber is connected to an intake port and an exhaust port, and intake air flowing into the main combustion chamber through the intake port forms a tumble flow of the mixture gas inside the main combustion chamber. A plurality of communicating holes communicating the internal space of the casing with the main combustion chamber are formed in the casing, the plurality of communicating holes include a first communicating hole opening to the intake port side in a radial direction of the main combustion chamber, and a second communicating hole opening to the exhaust port side. The tumble flow flowing into the pre-chamber through the first communicating hole forms in the pre-chamber a vortex flowing in the opposite direction from the tumble flow. The main combustion chamber is provided with a structure configured to suppress a flow opposing the vortex inside the pre-chamber flowing into the pre-chamber through the second communicating hole.

According to this configuration, the tumble flow formed in the main combustion chamber is flowed into the pre-chamber (i.e., a space inside the casing). In more detail, the casing is provided to the ceiling part of the main combustion chamber. The casing is provided so as to cover the ignition plug and protrudes into the main combustion chamber from the ceiling part. The plurality of communicating holes are formed in the casing, and the plurality of communicating holes include the first communicating hole opening to the intake port side in the radial direction of the main combustion chamber, and the second communicating hole opening to the exhaust port side.

The tumble flow flows such that intake air which flowed into the main combustion chamber from the intake port toward the exhaust port, returns from the exhaust port side along an upper surface of a piston to the intake port side, and then flows upward along an inner circumferential surface of a cylinder. The tumble flow flows from the intake port side to the exhaust port side, while flowing upward. A portion of the tumble flow flows into the pre-chamber through the first communicating hole opening to the intake port side. Since the casing protrudes into the main combustion chamber from the ceiling part, the tumble flow easily flows into the pre-chamber.

The mixture gas flowed into the pre-chamber through the first communicating hole, flows along an inner wall of the casing. As a result, the vortex flowing in the opposite direction from the tumble flow is formed.

The main combustion chamber is provided with the structure configured to suppress a flow opposing the vortex inside the pre-chamber (e.g., squish flow which flows from the exhaust port side toward the casing) flowing into the pre-chamber through the second communicating hole. This structure suppresses the vortex inside the pre-chamber becoming weak. Since the strong vortex is maintained in the pre-chamber, when the ignition plug ignites the mixture gas inside the pre-chamber, the mixture gas combusts rapidly.

As a result, it is suppressed that unburnt mixture gas is pushed out into the main combustion chamber from the pre-chamber. The flame generated inside the pre-chamber is blown off into the combustion chamber from the pre-chamber through the plurality of communicating holes. Thus, the mixture gas combusts rapidly also inside the main combustion chamber. The rapid combustion inside the main combustion chamber improves thermal efficiency of the internal combustion engine.

The structure may be a baffle wall provided to an upper surface of a piston forming the main combustion chamber, at a position closer to the exhaust port than the casing, and the baffle wall may be configured to impede a squish flow flowing to the casing from the exhaust port side.

The baffle wall provided to the upper surface of the piston is positioned closer to the exhaust port than the casing, and impedes the squish flow flowing to the casing from the exhaust port side. The squish flow hits the baffle wall and changes its direction so as to suppress the squish flow flowing into the pre-chamber through the second communicating hole. This structure suppresses the vortex inside the pre-chamber becoming weak.

Moreover, even if the baffle wall is provided to the upper surface of the piston, the geometric compression ratio of the combustion chamber does not change greatly. The structure providing the baffle wall to the upper surface of the piston is advantageous in achieving both of increasing of the geometric compression ratio of the combustion chamber and suppressing the vortex inside the pre-chamber becoming weak.

The structure may be a recess formed in an upper surface of the piston forming the main combustion chamber, and at least a part of the casing where the plurality of communicating holes are formed may be inserted into the recess, when the piston reaches a top dead center.

Since at least the part of the casing is inserted into the recess formed in the upper surface of the piston, the communicating holes are surrounded by the internal surface of the recess. The squish flow which flows toward the casing from the exhaust port side flowing into the pre-chamber through the second communicating hole is suppressed. Moreover, with this configuration, after the casing is inserted into the recess, the mixture gas inside the main combustion chamber flowing into the pre-chamber through the communicating holes from any direction is suppressed. This structure more effectively suppresses the vortex inside the pre-chamber becoming weak.

The structure may be a cavity formed in an upper surface of a piston forming the main combustion chamber. The pre-chamber may be located inward of an outer edge of the cavity when seen in an axial direction of the main combustion chamber. Squish areas configured to generate squish flows flowing to the center of the main combustion chamber may be provided to the piston, the squish areas being slopes formed so as to surround the periphery of the outer edge, and opposing the ceiling part at a location on the intake port side and a location on the exhaust port side, respectively. A radial width of the squish area on the exhaust port side may be smaller than a radial width of the squish area on the intake port side.

By making the area of the squish area on the exhaust port side in the upper surface of the piston smaller than the area of the squish area on the intake port side, the strength of the squish flow generated in the squish area on the exhaust port side is weaker than the strength of the squish flow generated in the squish area on the intake port side. Since the squish flow from the exhaust port side toward the casing is relatively weak, the squish flow flowing into the pre-chamber through the second communicating hole is suppressed.

Moreover, if the squish flow from the intake port side toward the casing flows into the pre-chamber through the first communicating hole, this squish flow acts to strengthen the vortex inside the pre-chamber. By relatively strengthening the squish flow from the intake port side toward the casing, it becomes advantageous to the rapid combustion of the mixture gas inside the pre-chamber.

This structure weakens the squish flow from the exhaust port side toward the casing, which is advantageous in that the baffle wall or the recess described above becomes unnecessary.

The structure may be a cavity formed in an upper surface of a piston forming the main combustion chamber. The pre-chamber may be located inward of an outer edge of the cavity when seen in an axial direction of the main combustion chamber. Squish areas configured to generate squish flows flowing to the center of the main combustion chamber may be provided to the piston, the squish areas being slopes formed so as to surround the periphery of the outer edge, and opposing the ceiling part at a location on the intake port side and a location on the exhaust port side, respectively. The squish area on the exhaust port side may be formed by a part of the piston on the exhaust port side in a radial direction of the main combustion chamber being concaved so that a distance between the squish area on the exhaust port side and the ceiling part in the axial direction of the main combustion chamber becomes larger than a distance between the squish area on the intake port side and the ceiling part.

According to this configuration, the strength of the squish flow generated in the squish area on the exhaust port side is weaker than the strength of the squish flow generated in the squish area on the intake port side. Since the squish flow from the exhaust port side toward the casing is relatively weak, the squish flow flowing into the pre-chamber through the second communicating hole is suppressed.

This structure weakens the squish flow from the exhaust port side toward the casing, which is advantageous in that the baffle wall or the recess described above becomes unnecessary.

The baffle wall may be provided to a flat part formed in a radially center part of the upper surface of the piston so as to protrude upwardly, and the baffle wall may overlap with the first communicating hole and the second communicating hole of the casing in an up-and-down direction, when the piston is located near a compression top dead center.

The baffle wall may be located on the exhaust port side of the casing, and have a C shape in a plan view.

The baffle wall may curve so as to be convex on the exhaust port side and curve so as to be concave on the intake port side, and the baffle wall may surround the periphery of the casing from the exhaust port side, when the piston is located near a compression top dead center.

The baffle wall may have a V shape oriented sideways in a plan view to have two walls. Ends of the two walls on the exhaust port side may be coupled to each other and ends of the two walls on the intake port side may be separated from each other to form a given angle therebetween.

The recess may be provided in an area of the upper surface of the piston on the intake port side from the center of the main combustion chamber in a radial direction, at a position directly below a tip-end part of the casing.

The recess may open to the upper surface of the piston, and an opening of the recess may have a circular shape or a substantially circular shape.

When the piston ascends and reaches a compression top dead center, a tip-end part of the casing may be inserted into the recess so that at least a part of the casing where the communicating holes are formed is inserted in the recess and the tip-end part of the casing is surrounded by an internal surface of the recess.

DETAILED DESCRIPTION OF THE DISCLOSURE

Figure 1:
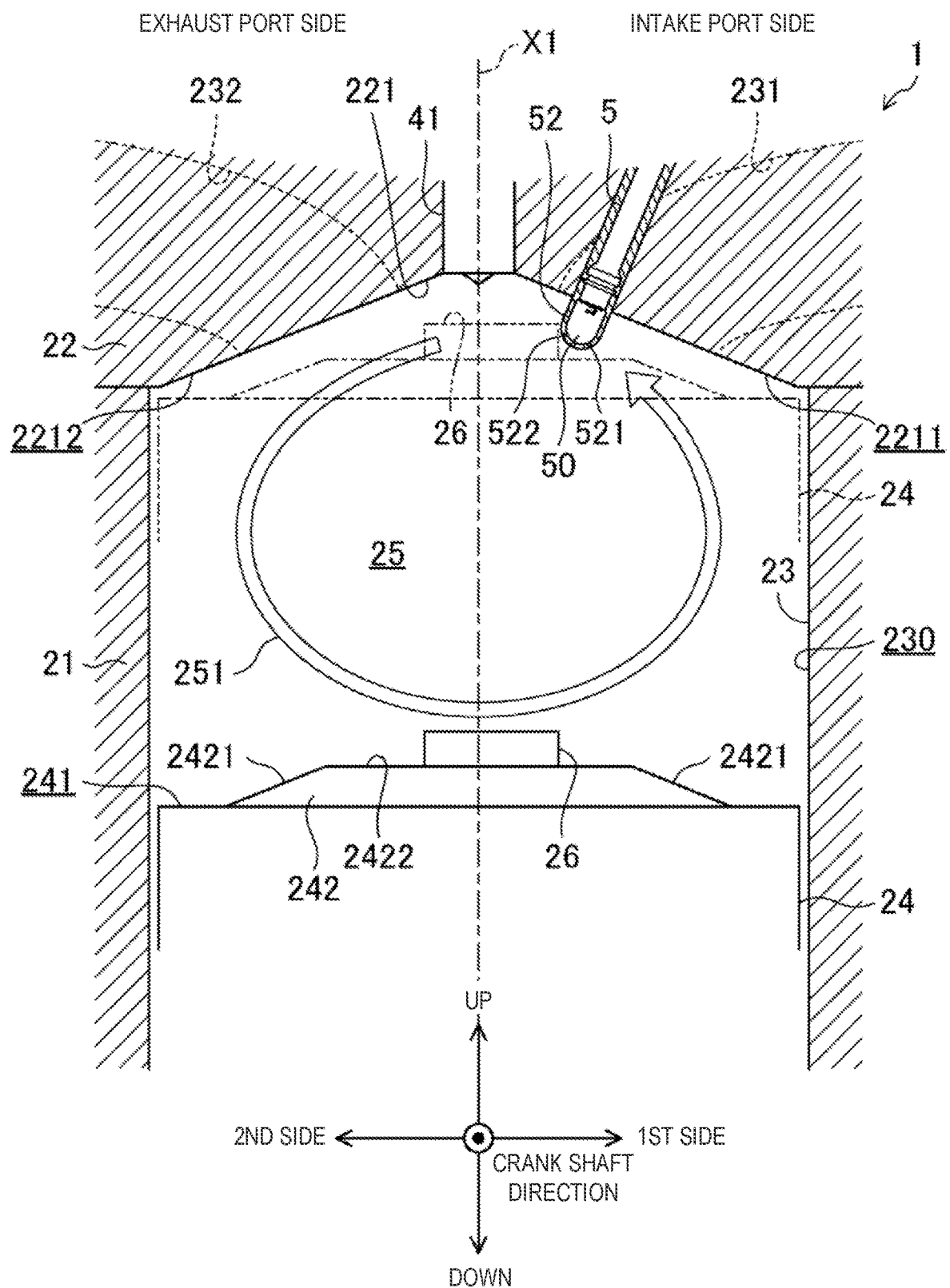
FIG. 1 is a cross-sectional view illustrating a configuration of a combustion chamber provided with a pre-chamber.

Hereinafter, an internal combustion engine with a pre-chamber is described with reference to the accompanying drawings. Note that the following description is illustration. FIG. 1 illustrates a configuration of a combustion chamber 25 (main combustion chamber) of an internal combustion engine 1. This internal combustion engine 1 is a four-stroke engine of a jump spark ignition type. Fuel is gasoline or other liquid fuels containing gasoline. The internal combustion engine 1 is mounted on a four-wheel vehicle. The vehicle is propelled by the output of the internal combustion engine 1 being transmitted to driving wheels.

Note that for convenience of the explanation below, up in the drawing sheet is referred to as "up" and down in the drawing sheet is referred to as "down." The "up" and "down" in the following description may not be in agreement with "up" and "down" in the internal combustion engine 1 mounted on the vehicle.

(Overall Configuration of Combustion Chamber)

The internal combustion engine 1 includes a cylinder block 21 and a cylinder head 22 placed on the cylinder block 21. A plurality of cylinders 23 are provided inside the cylinder block 21. The plurality of cylinders 23 are spaces formed inside cylindrical walls, and are lined up in a direction of a crankshaft (not illustrated). The direction of the crankshaft is a direction perpendicular to the drawing sheet of FIG. 1. Note that the number and layout of the cylinders of the internal combustion engine 1 are not limited to the particular number and layout.

A piston 24 coupled to the crankshaft through a connecting rod is fitted in each cylinder 23. The piston 24 reciprocates inside the cylinder 23. An upper surface 241 of the piston 24, a ceiling part 221 of the cylinder head 22, and an inner circumferential surface of the cylinder 23 form the combustion chamber 25.

Intake ports 231 are formed in the cylinder head 22 for every cylinder 23. Although illustration is omitted, two intake ports 231 are formed per cylinder 23. The two intake ports 231 are lined up in the direction of the crankshaft.

The intake ports 231 are provided on a first side of a center axis X1 of the cylinder 23. That is, in FIG. 1, the intake ports 231 are provided on the right side of the center axis X1 of the cylinder 23.

The intake ports 231 communicate with the combustion chamber 25. An intake valve (not illustrated) opens and closes the intake port 231. When the intake valve opens, intake air flows into the combustion chamber 25 from the intake ports 231. An intake valve operating mechanism (not illustrated) opens and closes the intake valve at a given timing.

Exhaust ports 232 are formed in the cylinder head 22 for every cylinder 23. Two exhaust ports 232 are formed per cylinder 23. The two exhaust ports 232 are lined up in the direction of the crankshaft.

The exhaust ports 232 are provided on a second side of the center axis X1 of the cylinder 23. That is, in FIG. 1, the exhaust ports 232 are provided on the left side of the center axis X1 of the cylinder 23. This internal combustion engine 1 is of a so-called "cross flow type."

The exhaust ports 232 communicate with the combustion chamber 25. An exhaust valve (not illustrated) opens and closes the exhaust port 232. When the exhaust valve opens, exhaust gas flows out from the combustion chamber 25 into the exhaust port 232. An exhaust valve operating mechanism (not illustrated) opens and closes the exhaust valve at a given timing.

The intake ports 231 are tumble ports which generate a tumble flow 251 inside the combustion chamber 25. As illustrated by an arrow in FIG. 1, intake air which flowed into the combustion chamber 25 from the intake ports 231 toward the exhaust ports 232 returns from the exhaust port 232 side along the upper surface 241 of the piston 24 to the intake port 231 side, and then flows upward along an inner circumferential surface 230 of the cylinder 23. This is the tumble flow 251. The tumble flow flows from the intake port 231 side to the exhaust port 232 side, while flowing upward.

The ceiling part 221 of the cylinder head 22 includes a slope 2211 which is an uphill from the intake port 231 side toward the center axis X1 of the cylinder 23, and a slope 2212 which is an uphill from the exhaust port 232 side toward the center axis X1 of the cylinder 23. That is, the ceiling part 221 of the cylinder head 22 has a so-called "pent roof shape."

A bulged part 242 which bulges upward from the upper surface 241 is provided to the upper surface 241 of the piston 24. When the bulged part 242 is provided to the upper surface 241 of the piston 24, the geometric compression ratio of the internal combustion engine 1 can be increased. The high geometric compression ratio improves thermal efficiency of the internal combustion engine 1.

In this example configuration, the bulged part 242 includes an opposing part 2421 provided in a radially outward part of the upper surface 241, and a flat part 2422 provided in a radially center part of the upper surface 241. The opposing part 2421 opposes the slopes 2211 and 2212. The opposing part 2421 is in parallel or almost in parallel to the slopes 2211 and 2212. The flat part 2422 spreads in a direction perpendicular to the center axis X1 of the cylinder 23.

Note that as will be described later in detail, a baffle wall 26 is provided to the upper surface 241 of the piston 24.

An injector 41 is attached to the cylinder head 22 for every cylinder 23. The injector 41 is disposed on the center axis X1 of the cylinder 23. The axis of the injector 41 is in agreement with the center axis X1 of the cylinder 23.

The injector 41 injects fuel directly into the cylinder 23. The injector 41 may have any configuration. For example, the injector 41 may be a multiple nozzle hole type injector.

The injector 41 receives a control signal from a controller (not illustrated), and injects a given amount of fuel into the cylinder 23 at a given timing. The injector 41 injects fuel into the cylinder 23, for example, within a period of an intake stroke, and/or a period in the first half of a compression stroke. Here, the period in the first half of the compression stroke means a period of the first half when bisecting the compression stroke to the first half and the second half. A fuel spray injected from the injector 41 is spread inside the combustion chamber 25 by the tumble flow 251 formed inside the combustion chamber 25. The tumble flow 251 of a mixture gas is formed inside the combustion chamber 25 after the injector 41 injects the fuel.

Note that the internal combustion engine 1 may be provided with a port injector which injects fuel into the intake port 231 in addition to or instead of the injector 41 which injects fuel into the cylinder 23. The port injector injects fuel into the intake port 231 and/or the combustion chamber 25, for example, in an intake stroke.

In addition, an ignition plug 5 is attached to the cylinder head 22 for every cylinder 23. The ignition plug 5 is disposed on the intake port 231 side of the center axis X1 of the cylinder 23. In the example configuration of FIG. 1, the ignition plug 5 leans to the center axis X1 of the cylinder 23. The ignition plug 5 is disposed, for example, between the two intake ports 231. The ignition plug 5 receives a control signal from the controller, and ignites the mixture gas at a given timing.

(Configuration of Pre-Chamber)

The internal combustion engine 1 has a pre-chamber 50 (i.e., an auxiliary combustion chamber). The pre-chamber 50 blows off flame of the mixture gas ignited inside the pre-chamber 50 into the combustion chamber 25 all at once through a plurality of communicating holes to achieve rapid combustion of the mixture gas, thereby improving thermal efficiency of the internal combustion engine 1.

Figure 2:
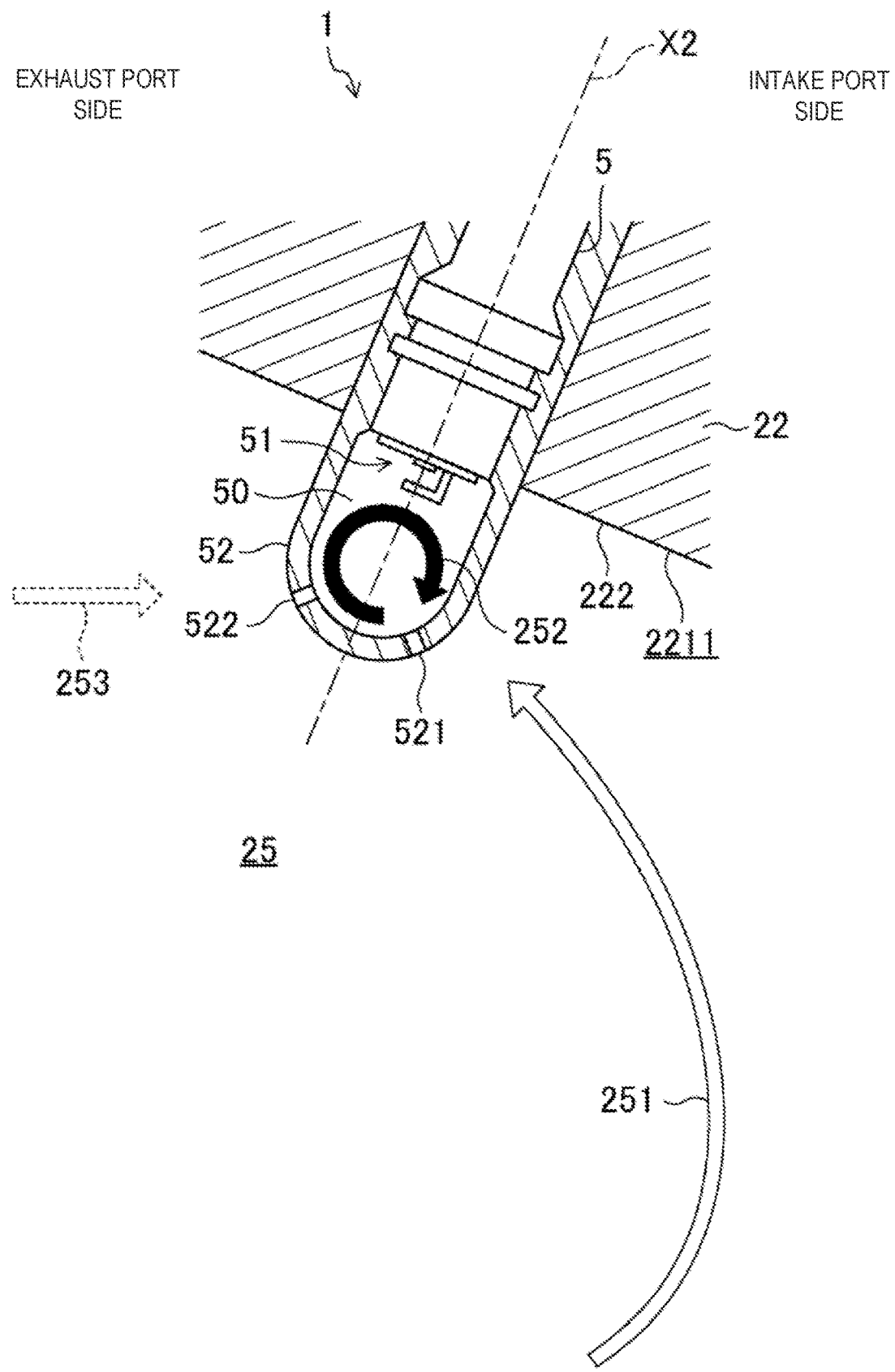
FIG. 2 is an enlarged view illustrating the pre-chamber.

FIG. 2 illustrates an enlarged view of the installed location of the ignition plug 5. An electrode 51 of the ignition plug 5 is located inward of the combustion chamber 25 from the slope 2211 of the ceiling part 221. A casing 52 is provided to the ignition plug 5. The casing 52 is provided to the ceiling part 221 so as to cover the electrode 51 of the ignition plug 5. The casing 52 protrudes inward of the combustion chamber 25 from the slope 2211 of the ceiling part 221. The pre-chamber 50 is provided with the ignition plug 5 and the casing 52. The casing 52 forms a space therein. The pre-chamber 50 is provided inside the combustion chamber 25. The casing 52 isolates an internal space (i.e., inside the pre-chamber 50) from the combustion chamber 25.

A tip-end part of the casing 52 has a hemispherical shape. Communicating holes 521 and 522 are formed in the tip-end part of the casing 52. The communicating holes 521 and 522 communicate the combustion chamber 25 with the internal space of the casing 52. The casing 52 has the plurality of communicating holes 521 and 522. Although illustration is omitted, the plurality of communicating holes 521 and 522 are formed in the tip-end part of the casing 52 symmetrically. As will be described later, the communicating holes 521 and 522 have a function to allow mixture gas inside the combustion chamber 25 to flow into the pre-chamber 50, and blow off the flame generated inside the pre-chamber 50 into the combustion chamber 25.

The plurality of communicating holes 521 and 522 include a first communicating hole 521 which opens to the intake port 231 side in the radial direction of the combustion chamber 25, and a second communicating hole 522 which opens to the exhaust port 232 side. A hole axis of the first communicating hole 521 leans at the hemispherical tip-end part of the casing 52 with respect to an axis X2 of the ignition plug 5, and a hole axis of the second communicating hole 522 leans at the hemispherical tip-end part of the casing 52 to the opposite direction from the first communicating hole 521 with respect to the axis X2 of the ignition plug 5.

As described above, inside the combustion chamber 25, the tumble flow 251 of the mixture gas is formed in an intake stroke and/or a compression stroke. As illustrated by a white arrow in FIG. 2, the tumble flow 251 of mixture gas becomes a flow which goes to the exhaust port 232 side from the intake port 231 side with respect to the casing 52. A portion of the mixture gas flows into the pre-chamber 50 from the combustion chamber 25 through the first communicating hole 521.

The mixture gas which flowed into the pre-chamber 50 flows along an inner wall of the casing 52. Therefore, a vortex 252 in the opposite direction from the tumble flow 251 is formed in the pre-chamber 50 (see a black arrow in FIG. 2). In the example of FIG. 2, the tumble flow 251 inside the combustion chamber 25 is in the counterclockwise direction, and the vortex 252 inside the pre-chamber 50 is in the clockwise direction. Here, the mixture gas which flowed into the pre-chamber 50 flows along the hemispherical inner wall of the casing 52 to stimulate the formation of the vortex 252.

In the pre-chamber 50 formed inside the casing 52, the electrode 51 of the ignition plug 5 is provided in an upper end part of the pre-chamber 50, and the communicating holes 521 and 522 are provided in a lower end part of the pre-chamber 50. A distance between the ignition plug 5 and the communicating holes 521 and 522 is comparatively long. If combustion of the mixture gas inside the pre-chamber 50 is slow, flame generated on the ignition plug 5 side may push out unburnt mixture gas which remains on the communicating holes 521 and 522 side into the combustion chamber 25. In this case, the rapid combustion inside the combustion chamber 25 is impaired.

On the other hand, the foregoing configuration allows the tumble flow 251 inside the combustion chamber 25 to flow into the pre-chamber 50 through the first communicating hole 521 to form the vortex 252 of the mixture gas inside the pre-chamber 50. Since the vortex 252 does not disturb the flow inside the pre-chamber 50, the ignitability of the ignition plug 5 will not be reduced. The ignition plug 5 can promptly ignite the mixture gas inside the pre-chamber 50. Moreover, the vortex 252 stimulates the flame propagation after ignition. The mixture gas inside the pre-chamber 50 combusts rapidly. Since the mixture gas combusts rapidly, unburnt mixture gas being pushed out into the combustion chamber 25 from the pre-chamber 50 is suppressed. By accelerating the combustion inside the pre-chamber 50, the mixture gas also combusts rapidly inside the combustion chamber 25, and therefore, thermal efficiency of the internal combustion engine 1 improves.

Here, according to the analyses of the present inventors, they have noticed that the combustion of the mixture gas inside the pre-chamber 50 may not become as rapid as they expected, even if the vortex 252 is generated inside the pre-chamber 50. The reason why the combustion of the mixture gas does not become rapid is, as illustrated by a broken-line arrow in FIG. 2, that a squish flow 253 which is generated inside the combustion chamber 25 in the end of the compression stroke flows into the pre-chamber 50 through the second communicating hole 522 which opens to the exhaust port 232 side. Here, the end of the compression stroke means a final stage of a compression stroke, when trisecting the compression stroke into an opening stage, a middle stage, and a final stage. The squish flow 253 is a flow caused in connection with a volume of a circumferential edge part of the combustion chamber 25 being reduced as compared to a volume of a center part of the combustion chamber 25 as the piston 24 ascends, and flows to the center part from the circumferential edge part.

When the squish flow flows into the pre-chamber 50 through the second communicating hole 522 in the final stage of the compression stroke, the flow opposes the vortex 252 inside the pre-chamber 50, and, as a result, the vortex 252 is weakened. When the vortex 252 inside the pre-chamber 50 becomes weaker, the acceleration of the combustion of the mixture gas is impeded.

Thus, the combustion chamber 25 of the internal combustion engine 1 is provided with a structure for suppressing the flow opposing the vortex 252 inside the pre-chamber 50 flowing into the pre-chamber 50 through the second communicating hole 522.

(First Example of Inflow Control Structure for Squish Flow)

In a first example structure, the internal combustion engine 1 has the baffle wall 26 provided to the upper surface 241 of the piston 24. As illustrated in FIG. 1, the baffle wall 26 is provided to the flat part 2422 so as to protrude upward. As illustrated by a two-dot chain line in FIG. 1, the baffle wall 26 is provided so that it overlaps with the first communicating hole 521 and the second communicating hole 522 of the casing 52 in the up-and-down direction when the piston 24 is located near a compression top dead center.

The baffle wall 26 is located on the exhaust port 232 side of the casing 52. For example, as illustrated in the top figure 31 of FIG. 3, the baffle wall 26 has a C shape in the plan view. The baffle wall 26 curves so that it is convex on the exhaust port 232 side, and is concave on the intake port 231 side. When the piston 24 is located near the compression top dead center, the baffle wall 26 surrounds the periphery of the casing 52 from the exhaust port 232 side.

The baffle wall 26 prevents the squish flow 253 which flows toward the casing 52 from the exhaust port 232 side. In detail, as illustrated in the top figure 31 of FIG. 3, the squish flow 253 flows along a side surface of the curved baffle wall 26. Thus, the squish flow 253 leaves from the casing 52 to both sides of the crankshaft. The baffle wall 26 suppresses the squish flow 253 flowing into the pre-chamber 50 through the second communicating hole 522 of the casing 52.

Here, when the piston 24 reaches a compression top dead center, the height of the baffle wall 26 is desirably be such that it does not contact the ceiling part 221 but the squish flow does not climb over the baffle wall 26. Thus, the baffle wall 26 can effectively suppress the squish flow 253 flowing into the pre-chamber 50 through the second communicating hole 522 of the casing 52.

Since the baffle wall 26 suppresses the squish flow into the pre-chamber 50, the strong vortex 252 is maintained inside the pre-chamber 50 also in the final stage of the compression stroke. As a result, after the ignition plug 5 ignites the mixture gas, the rapid combustion inside the pre-chamber 50 is achieved, and the unburnt mixture gas being pushed out into the combustion chamber 25 from the pre-chamber 50 is suppressed. The rapid combustion of the mixture gas inside the combustion chamber 25 is also achieved.

(Modification 1)

Figure 3:
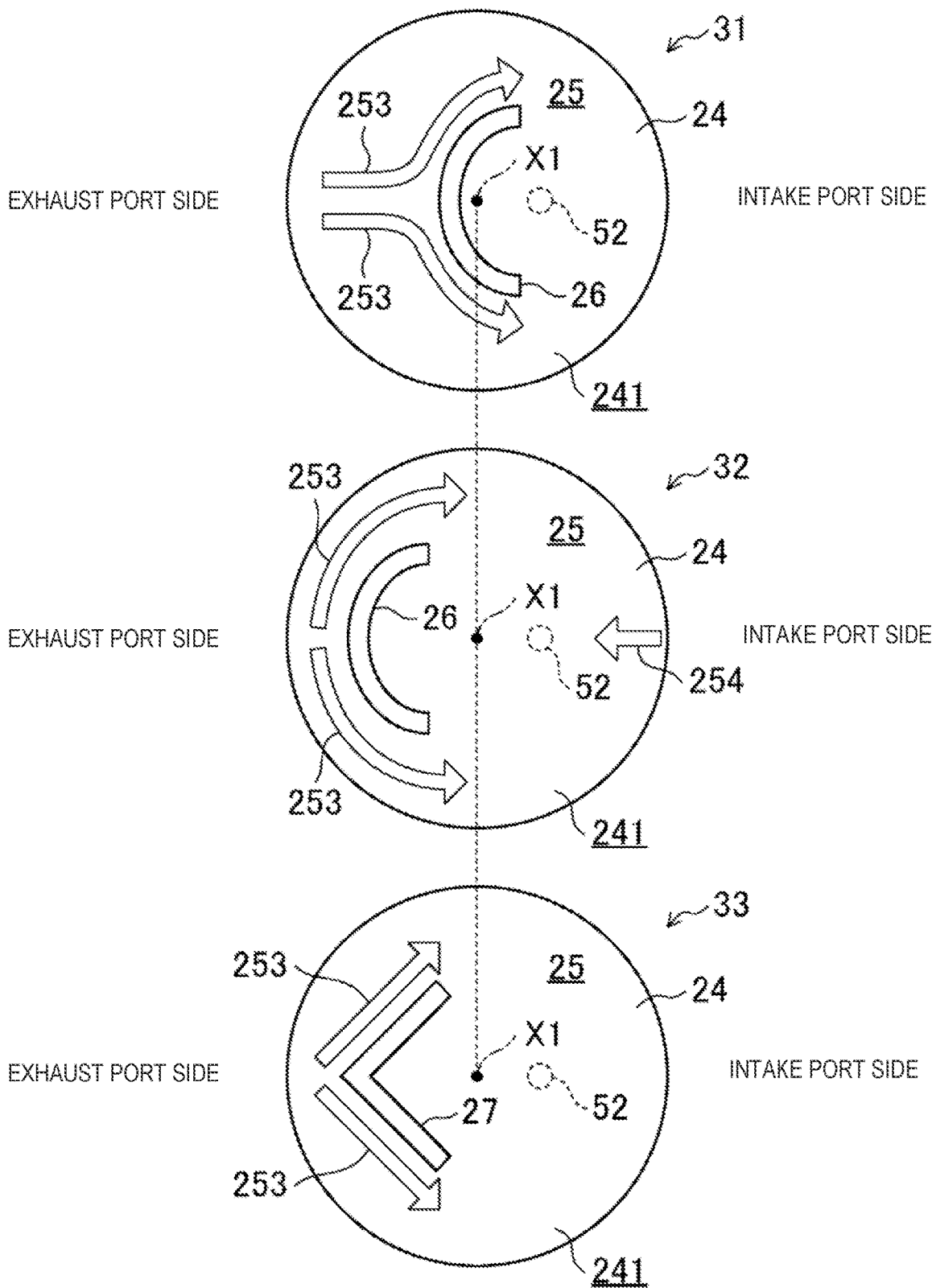
FIG. 3 illustrates plan views on an upper surface of a piston, respectively illustrating examples of a configuration of a baffle wall.

The middle figure 32 of FIG. 3 illustrates a modification of the layout of the baffle wall 26. The baffle wall 26 may be provided to the upper surface 241 of the piston 24 so as to be separated from the casing 52. In the middle figure 32, the baffle wall 26 is disposed in the upper surface 241, at a position on the exhaust port 232 side of the center axis X1 of the cylinder 23.

The baffle wall 26 of this layout can also impede the squish flow 253 which flows toward the casing 52 from the exhaust port 232 side. Therefore, it is suppressed that the squish flow flows into the pre-chamber 50 through the second communicating hole 522 of the casing 52.

Moreover, since the baffle wall 26 is separated from the casing 52, as illustrated by an arrow in the middle figure 32, a squish flow 254 which goes toward the center part of the combustion chamber 25 from the intake port 231 side becomes easier to flow into the casing 52 through the first communicating hole 521. Since this flow flows along the vortex 252 inside the casing 52, it strengthens the vortex 252. As the vortex 252 becomes stronger, it becomes more advantageous to the rapid combustion of the mixture gas inside the pre-chamber 50.

On the other hand, when the baffle wall 26 is close to the casing 52 as illustrated in the top figure 31, the baffle wall 26 receives the squish flow 254 which goes toward the center part of the combustion chamber 25 from the intake port 231 side so that the pressure at the backside of the casing 52 is increased. The squish flow 254 which goes to the center part of the combustion chamber 25 from the intake port 231 side is difficult to flow into the casing 52. However, when the baffle wall 26 is close to the casing 52, the effect of suppressing the squish flow 253 from the exhaust port 232 side flowing into the casing 52 through the second communicating hole 522 is increased.

(Modification 2)

The bottom figure 33 of FIG. 3 illustrates a modification of the shape of the baffle wall. A baffle wall 27 has a V shape which is oriented sideways in the plan view. The baffle wall 27 is comprised of two walls. Ends of the two walls on the exhaust port 232 side are coupled to each other. Other ends of the two walls on the intake port 231 side are separated from each other. The two walls form a given angle therebetween.

The squish flow 253 which goes toward the casing 52 from the exhaust port 232 side flows along the side surface of the baffle wall 27. Thus, the squish flow leaves from the casing 52 to both sides of the crankshaft. The squish flow 253 flowing into the pre-chamber 50 through the second communicating hole 522 of the casing 52 is suppressed.

Note that although illustration is omitted, the baffle wall 27 may be provided at a position close to the casing 52.

(Second Example of Inflow Control Structure for Squish Flow)

Figure 4:
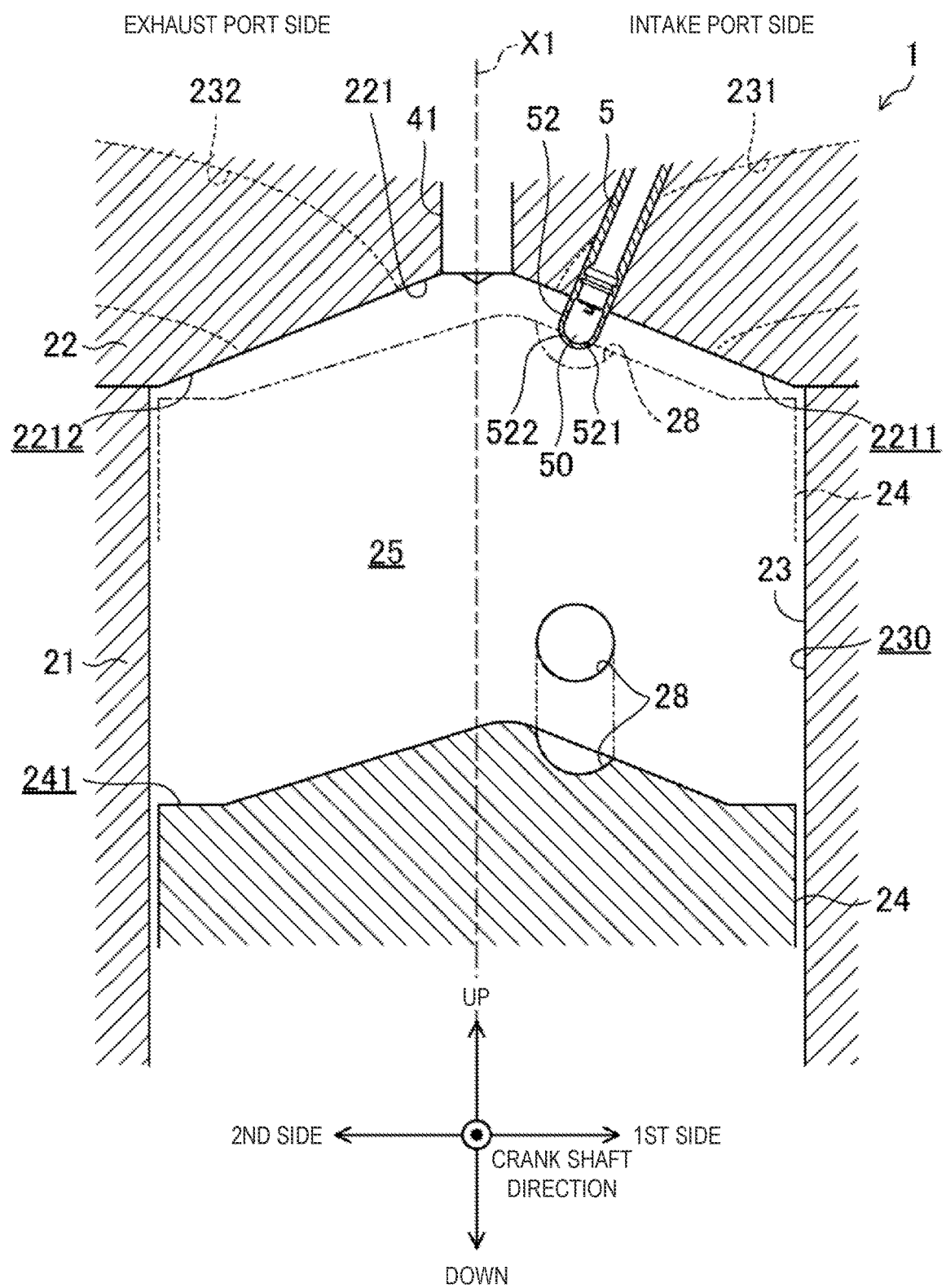
FIG. 4 is a view corresponding to FIG. 1, illustrating a combustion chamber having a different configuration from FIG. 1.

FIG. 4 illustrates a second example of the inflow control structure for the squish flow provided to the combustion chamber 25. A recess 28 is formed in the upper surface 241 of the piston 24, instead of the baffle wall 26 or 27. The recess 28 is formed in an area of the upper surface 241 of the piston 24, on the intake port side in the radial direction of the main combustion chamber from the center, and at a position directly below the tip-end part of the casing 52. The recess 28 opens in the upper surface 241 of the piston 24. As illustrated in FIG. 4, the opening of the recess 28 has a circular shape or a substantially circular shape. Note that the shape of the opening of the recess 28 is not limited to the particular shapes.

As illustrated by a two-dot chain line in FIG. 4, when the piston 24 goes up and reaches a compression top dead center, the tip-end part of the casing 52 is inserted into the recess 28. At least a part of the casing 52 where the communicating holes 521 and 522 are formed is inserted into the recess 28. Since the tip-end part of the casing 52 is surrounded by the internal surface of the recess 28, the squish flow 253 which flows toward the casing 52 from the exhaust port 232 side flowing into the pre-chamber 50 through the second communicating hole 522 is suppressed.

This structure also suppresses, after the casing 52 is inserted into the recess 28, the mixture gas inside the combustion chamber 25 flowing into the pre-chamber 50 through the communicating holes 521 and 522 from any direction.

As a result, this structure also suppresses the vortex 252 inside the pre-chamber 50 being weakened. Therefore, the rapid combustion inside the pre-chamber 50 is achieved, and the rapid combustion of the mixture gas inside the combustion chamber 25 is also achieved.

(Third Example of Inflow Control Structure for Squish Flow)

Figure 5:
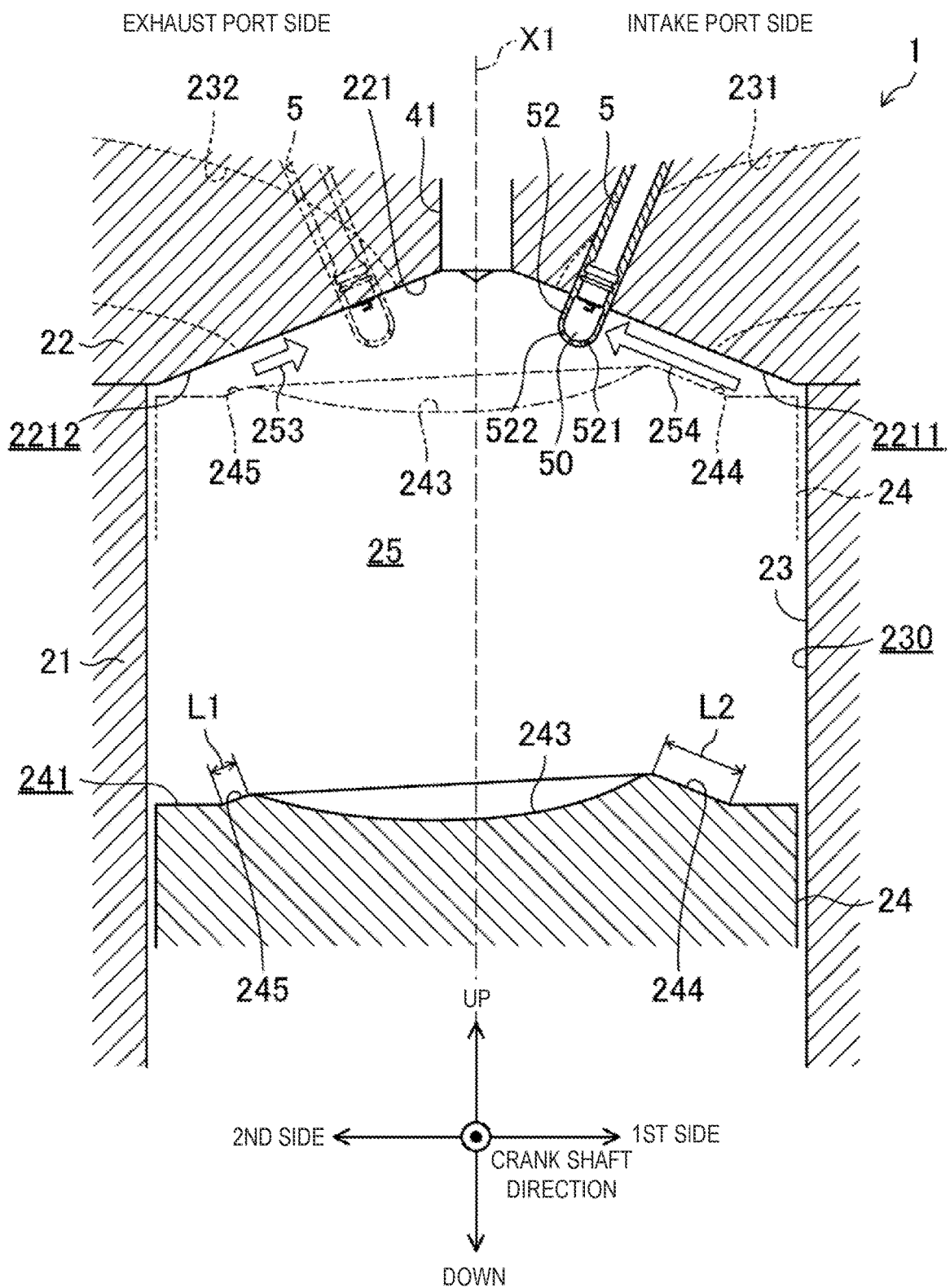
FIG. 5 is a view corresponding to FIG. 1, illustrating a combustion chamber having a different configuration from FIGS. 1 and 4.

FIG. 5 illustrates a third example of the inflow control structure for the squish flow provided to the combustion chamber 25. A cavity 243 is formed in the upper surface 241 of the piston 24. In the center part of the piston 24, the cavity 243 is dented from the upper surface 241. In more detail, the center of the cavity 243 is offset to the exhaust port 232 side from the center axis X1 of the cylinder 23. The pre-chamber 50 is located inside the outer edge of the cavity 243.

In the periphery of the outer edge of the cavity 243, an intake-side squish area 244 and an exhaust-side squish area 245 which oppose the ceiling part 221 are formed so as to surround the outer edge. As illustrated in FIG. 5, the squish area 244 is an incline from the intake port 231 side toward the center part of the combustion chamber 25 so that it becomes parallel to the slope 2211 on the intake port 231 side of the center axis X1 of the cylinder 23. The squish area 245 is an incline from the exhaust port 232 side toward the center part of the combustion chamber 25 so that it becomes parallel to the slope 2212 on the exhaust port 232 side of the center axis X1 of the cylinder 23.

As illustrated by an arrow in FIG. 5, as the piston 24 goes up, the spacing between the intake-side squish area 244 and the slope 2211 becomes narrower, and the squish flow 254 which goes to the center part of the combustion chamber 25 from the intake port 231 side then occurs. Similarly, when the spacing between the exhaust-side squish area 245 and the slope 2212 becomes narrower, the squish flow 253 which goes to the center part of the combustion chamber 25 from the exhaust port 232 side occurs.

Here, since the center of the cavity 243 is offset to the exhaust port 232 side, an intake-exhaust-direction length (or width) L1 of the exhaust-side squish area 245 is shorter than an intake-exhaust-direction length (width) L2 of the intake-side squish area 244. The intake-exhaust-direction length corresponds to a length in the left-and-right direction in FIG. 5. Thus, the area of the exhaust-side squish area 245 is formed smaller than the area of the intake-side squish area 244. Accordingly, the strength of the squish flow 253 which goes to the center part of the combustion chamber 25 from the exhaust port 232 side is weaker than the strength of the squish flow 254 which goes to the center part of the combustion chamber 25 from the intake port 231 side. Therefore, the squish flow 253 flowing into the pre-chamber 50 through the second communicating hole 522 is suppressed.

Moreover, the squish flow 254 from the intake port 231 side and the squish flow 253 from the exhaust port 232 side collide with each other inside the combustion chamber 25. Since the two squish flows 253 and 254 differ in the strength, the strength of the squish flow 253 from the exhaust port 232 side is further weakened. Therefore, the squish flow 253 flowing into the pre-chamber 50 is further suppressed.

Moreover, as described above, if the squish flow 254 from the intake port 231 side flows into the pre-chamber 50 through the first communicating hole 521, it becomes advantageous to the rapid combustion of the mixture gas inside the pre-chamber 50, because the vortex 252 inside the pre-chamber 50 becomes stronger.

Note that since the squish flow 254 from the intake port 231 side has the function for weakening the squish flow 253 from the exhaust port 232 side as described above even if it does not flow into the pre-chamber 50, the effect of reducing the vortex control inside the pre-chamber 50 can still be acquired.

Here, as illustrated by a two-dot chain line in FIG. 5, the ignition plug 5 and the casing 52 may be attached on the exhaust port 232 side of the center axis X1 of the cylinder 23, instead of the intake port 231 side. In this case, a strong intake flow which is generated when the intake valve opens flows into the pre-chamber 50 through the first communicating hole 521, in addition to the tumble flow 251 described above. Therefore, the vortex 252 inside the pre-chamber 50 can further be strengthened.

Note that if the ignition plug 5 and the casing 52 are attached to the intake port 231 side, the ignition plug 5 and the casing 52 can be cooled by intake air. Therefore, generation of a heat spot can be prevented.

(Fourth Example of Inflow Control Structure for Squish Flow)

Figure 6:
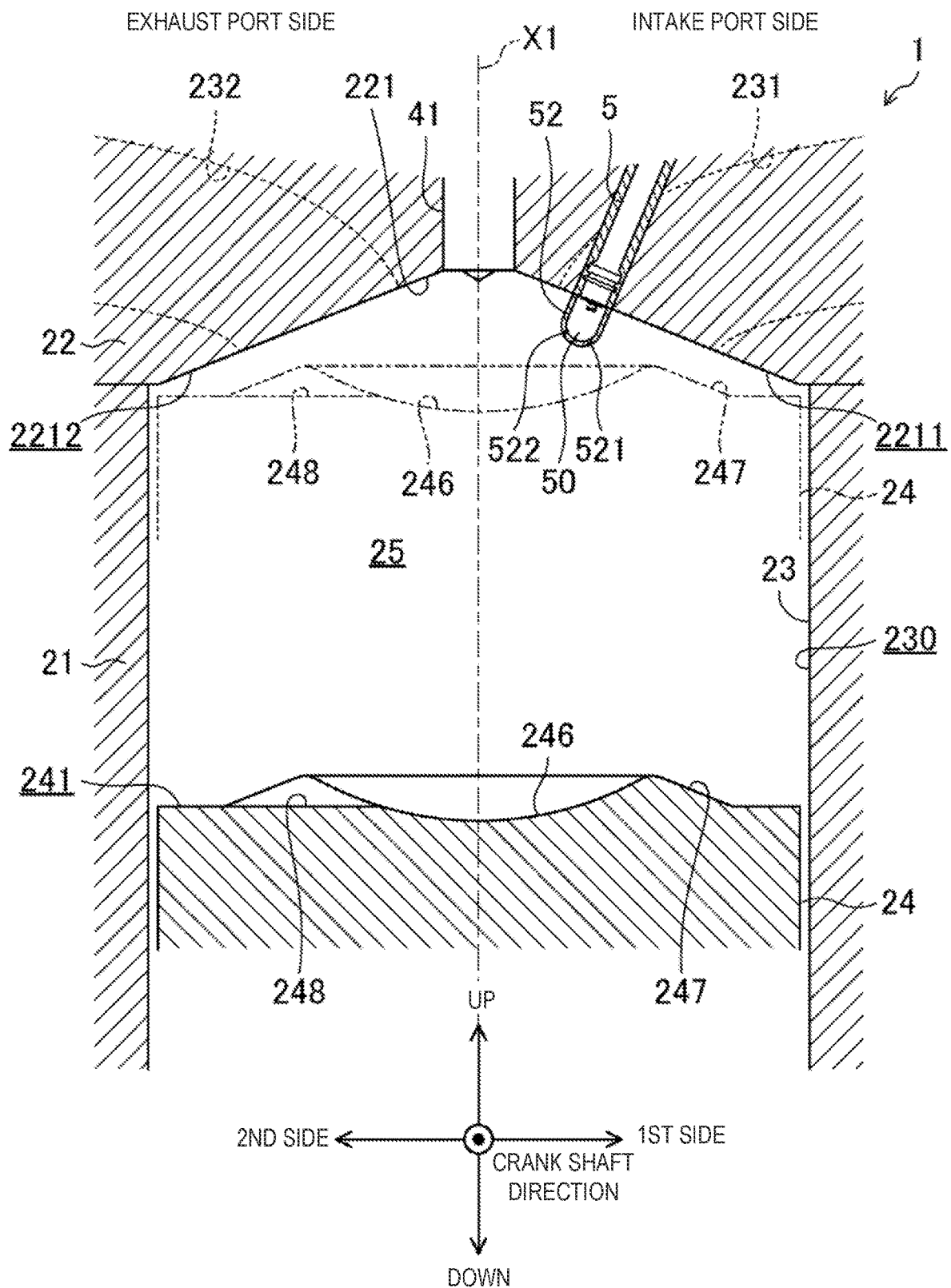
FIG. 6 is a view corresponding to FIG. 1, illustrating a combustion chamber having a different configuration from FIG. 5.
Figure 7:
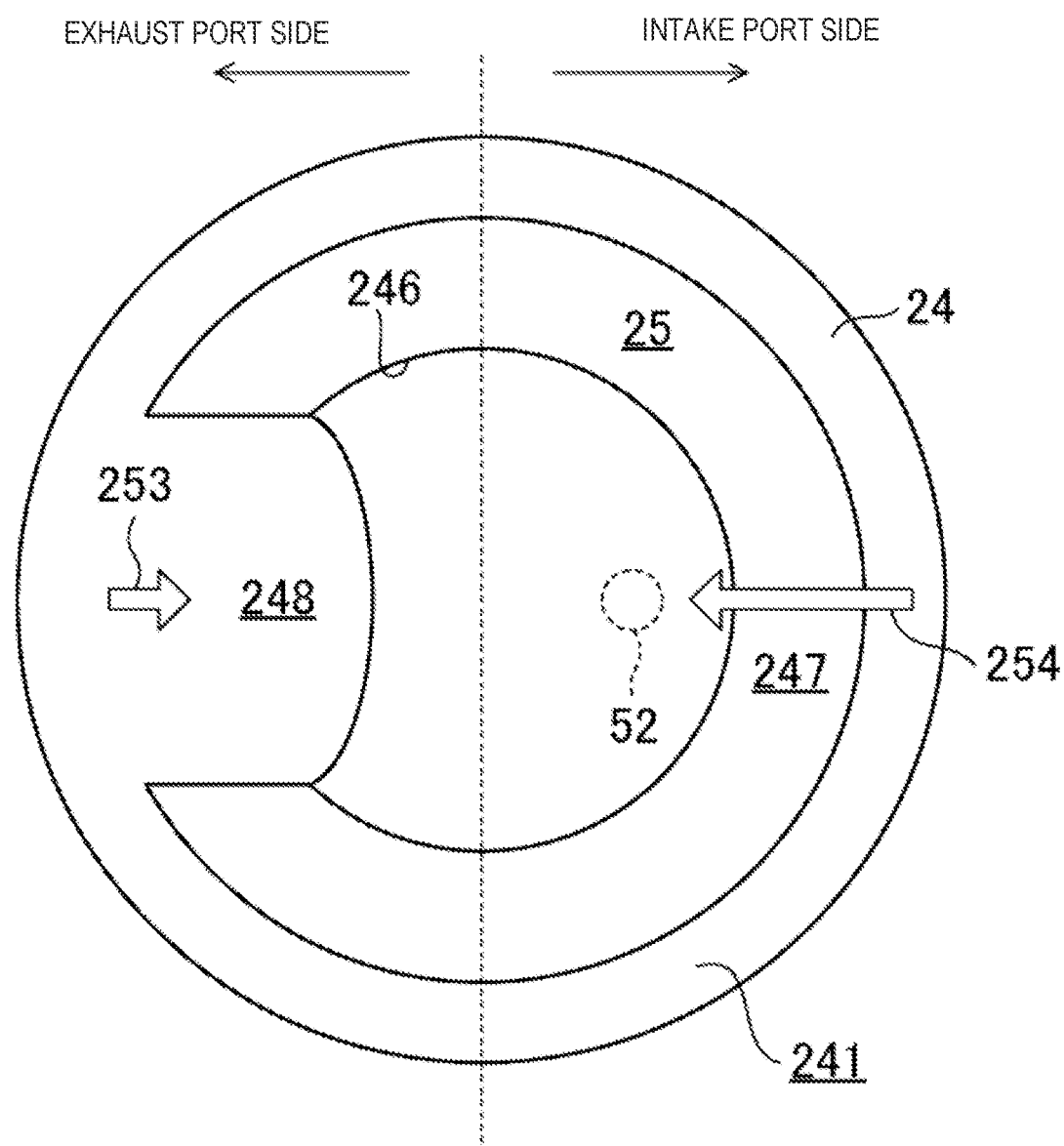
FIG. 7 is a plan view illustrating an upper surface of a piston inside the combustion chamber of FIG. 6.

FIGS. 6 and 7 illustrate a fourth example of the inflow control structure for the squish flow provided to the combustion chamber 25. A cavity 246 is formed in the upper surface 241 of the piston 24. The cavity 246 is disposed coaxially with the center axis X1 of the cylinder 23. The pre-chamber 50 is located inside an outer edge of the cavity 246. The periphery of the outer edge of the cavity 246 is bulged upwardly. Squish areas 247 and 248 which oppose the ceiling part 221 are formed in the periphery of the outer edge of the cavity 246.

The squish area 247 is an incline toward the center part of the combustion chamber 25 from the intake port 231 side so that it becomes parallel to the slope 2211 on the intake port 231 side of the center axis X1 of the cylinder 23. On the other hand, the squish area 248 is formed by scooping out the bulged part in the periphery of the outer edge of the cavity 243, on the exhaust port 232 side of the center axis X1 of the cylinder 23. Thus, since the squish area 248 has a relatively large spacing with the slope 2212, the squish flow 253 which goes to the center part of the combustion chamber 25 from the exhaust port 232 side becomes relatively weak, even when the piston 24 reaches a compression top dead center. Therefore, similar to the above, the squish flow 253 flowing into the pre-chamber 50 through the second communicating hole 522 is suppressed.

Moreover, when the squish flow 254 from the intake port 231 side and the squish flow 253 from the exhaust port 232 side collide with each other inside the combustion chamber 25, the strength of the squish flow 253 from the exhaust port 232 side becomes further weaker. Therefore, the squish flow 253 flowing into the pre-chamber 50 is further suppressed.

Moreover, as described above, if the squish flow 254 from the intake port 231 side flows into the pre-chamber 50 through the first communicating hole 521, since the vortex 252 inside the pre-chamber 50 becomes further stronger, it is advantageous to the rapid combustion of the mixture gas inside the pre-chamber 50.

Although illustration is omitted, also in the example configuration of FIG. 6, the ignition plug 5 and the casing 52 may be attached to the exhaust port 232 side of the center axis X1 of the cylinder 23, instead of the intake port 231 side.

Note that the illustrated shape of the combustion chamber 25 is one example. The art disclosed herein is applicable to combustion chambers with various shapes.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Internal Combustion Engine
221 Ceiling Part
231 Intake Port
232 Exhaust Port
24 Piston
241 Upper Surface
244, 245, 247, 248 Squish Area
25 Combustion Chamber (Main Combustion Chamber)
251 Tumble Flow
252 Vortex
253, 254 Squish Flow
26, 27 Baffle Wall
28 Recess
5 Ignition Plug
50 Pre-Chamber
52 Casing
521 First Communicating Hole
522 Second Communicating Hole

What is claimed is:

1. An internal combustion engine with a pre-chamber provided inside a main combustion chamber, the pre-chamber comprising:
    an ignition plug attached to a ceiling part of the main combustion chamber and configured to ignite a mixture gas containing a fuel component and air; and
    a casing provided to the ceiling part so as to cover the ignition plug, the casing isolating an internal space formed therein from the main combustion chamber,
    wherein the main combustion chamber is connected to an intake port and an exhaust port, and intake air flowing into the main combustion chamber through the intake port forms a tumble flow of the mixture gas inside the main combustion chamber,
    wherein a plurality of communicating holes communicating the internal space of the casing with the main combustion chamber are formed in the casing, the plurality of communicating holes include a first communicating hole opening to the intake port side in a radial direction of the main combustion chamber, and a second communicating hole opening to the exhaust port side,
    wherein the tumble flow flowing into the pre-chamber through the first communicating hole forms in the pre-chamber a vortex flowing in the opposite direction from the tumble flow, and
    wherein the main combustion chamber is provided with a structure configured to suppress a flow opposing the vortex inside the pre-chamber flowing into the pre-chamber through the second communicating hole.

2. The internal combustion engine of claim 1, wherein the structure is a baffle wall provided to an upper surface of a piston forming the main combustion chamber, at a position closer to the exhaust port than the casing, the baffle wall being configured to impede a squish flow flowing to the casing from the exhaust port side.

3. The internal combustion engine of claim 2, wherein the baffle wall is provided to a flat part formed in a radially center part of the upper surface of the piston so as to protrude upwardly, and the baffle wall overlaps with the first communicating hole and the second communicating hole of the casing in an up-and-down direction, when the piston is located near a compression top dead center.

4. The internal combustion engine of claim 2, wherein the baffle wall is located on the exhaust port side of the casing, and has a C shape in a plan view.

5. The internal combustion engine of claim 4, wherein the baffle wall curves so as to be convex on the exhaust port side and curves so as to be concave on the intake port side, and the baffle wall surrounds the periphery of the casing from the exhaust port side, when the piston is located near a compression top dead center.

6. The internal combustion engine of claim 2,
    wherein the baffle wall has a V shape oriented sideways in a plan view to have two walls, and
    wherein ends of the two walls on the exhaust port side are coupled to each other and ends of the two walls on the intake port side are separated from each other to form a given angle therebetween.

7. The internal combustion engine of claim 1, wherein the structure is a recess formed in an upper surface of a piston forming the main combustion chamber, and at least a part of the casing where the plurality of communicating holes are formed is inserted into the recess, when the piston reaches a top dead center.

8. The internal combustion engine of claim 7, wherein the recess is provided in an area of the upper surface of the piston on the intake port side from the center of the main combustion chamber in a radial direction, at a position directly below a tip-end part of the casing.

9. The internal combustion engine of claim 8, wherein, when the piston ascends and reaches a compression top dead center, the tip-end part of the casing is inserted into the recess so that at least a part of the casing where the communicating holes and are formed is inserted in the recess and the tip-end part of the casing is surrounded by an internal surface of the recess.

10. The internal combustion engine of claim 7, wherein the recess opens to the upper surface of the piston, and an opening of the recess has a circular shape or a substantially circular shape.

11. The internal combustion engine of claim 10, wherein, when the piston ascends and reaches a compression top dead center, the tip-end part of the casing is inserted into the recess so that at least a part of the casing where the communicating holes and are formed is inserted in the recess and the tip-end part of the casing is surrounded by an internal surface of the recess.

12. The internal combustion engine of claim 1,
wherein the structure is a cavity formed in an upper surface of a piston forming the main combustion chamber,
wherein the pre-chamber is located inward of an outer edge of the cavity when seen in an axial direction of the main combustion chamber,
wherein squish areas configured to generate squish flows flowing to the center of the main combustion chamber are provided to the piston, the squish areas being slopes formed so as to surround the periphery of the outer edge, and opposing the ceiling part at a location on the intake port side and a location on the exhaust port side, respectively, and
wherein a radial width of the squish area on the exhaust port side is smaller than a radial width of the squish area on the intake port side.

13. The internal combustion engine of claim 1,
wherein the structure is a cavity formed in an upper surface of a piston forming the main combustion chamber,
wherein the pre-chamber is located inward of an outer edge of the cavity when seen in an axial direction of the main combustion chamber,
wherein squish areas configured to generate squish flows flowing to the center of the main combustion chamber are provided to the piston, the squish areas being slopes formed so as to surround the periphery of the outer edge, and opposing the ceiling part at a location on the intake port side and a location on the exhaust port side, respectively, and
wherein the squish area on the exhaust port side is formed by a part of the piston on the exhaust port side in a radial direction of the main combustion chamber being concaved so that a distance between the squish area on the exhaust port side and the ceiling part in the axial direction of the main combustion chamber becomes larger than a distance between the squish area on the intake port side and the ceiling part.

* * * * *